E. A. SPAGNOLO.
SHOCK ABSORBER.
APPLICATION FILED APR. 28, 1914.
1,120,555.
Patented Dec. 8, 1914.
2 SHEETS—SHEET 1.
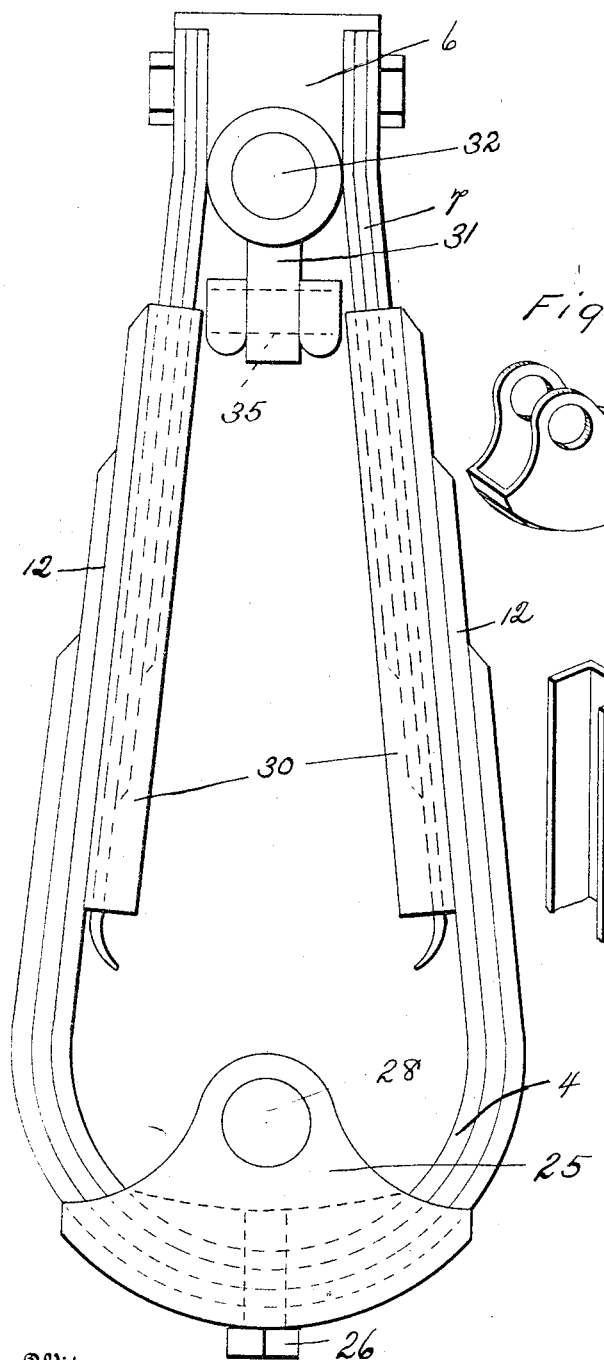
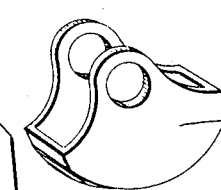
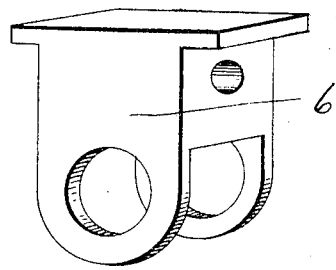
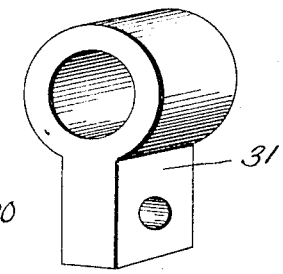
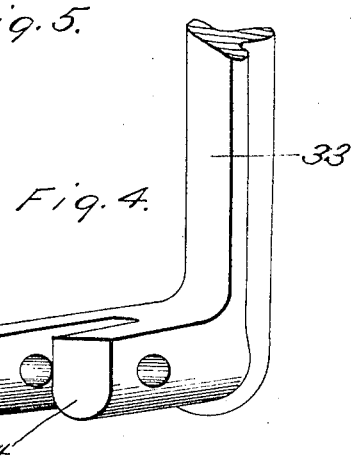
Inventor
E. A. Spagnolo
By James J. Sheehy & Co.
Attorneys
Witnesses
O. C. Duffy
E. F. Sheeley.

E. A. SPAGNOLO.
SHOCK ABSORBER.
APPLICATION FILED APR. 28, 1914.
1,120,555.
Patented Dec. 8, 1914.
2 SHEETS—SHEET 2.
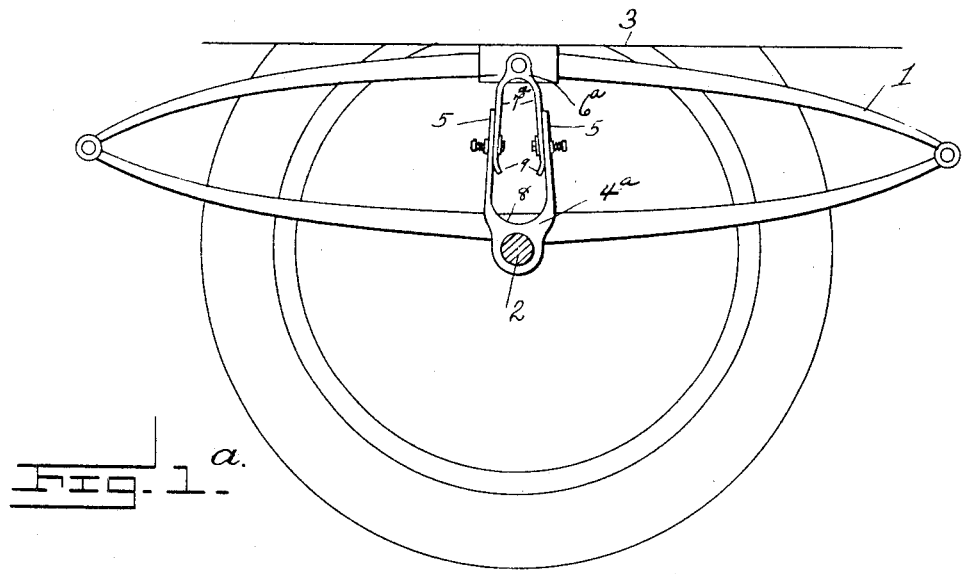
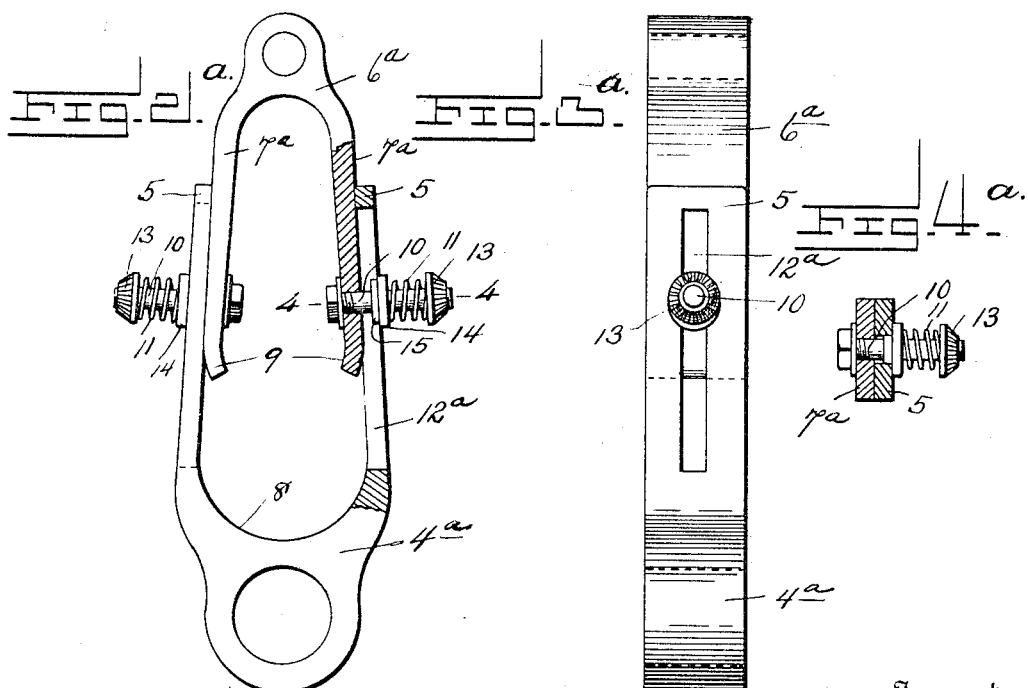

UNITED STATES PATENT OFFICE.

ETTORE AMEDEO SPAGNOLO, OF WOONSOCKET, RHODE ISLAND.

SHOCK-ABSORBER.

1,120,555.      Specification of Letters Patent.      Patented Dec. 8, 1914.

Application filed April 28, 1914. Serial No. 834,937.

*To all whom it may concern:*

Be it known that I, ETTORE A. SPAGNOLO, a subject of the King of Italy, residing at Woonsocket, in the county of Providence and State of Rhode Island, have invented new and useful Improvements in Shock-Absorbers, of which the following is a specification.

My invention pertains to shock absorbers for use on automobiles and other vehicles having spring-supported bodies, and it contemplates the provision of a simple, compact and durable shock absorber, calculated to efficiently counteract the movements of the body of a vehicle relative to the axles thereof, and vice versa, as when the vehicle is passing over a rough road, and in that way prevent the transmission of shock and jar to the passengers in the body.

With the foregoing in mind the invention will be fully understood from the following description and claims when the same are read in connection with the drawings, accompanying and forming part of this specification, in which:

Figure 1 is a side elevation of the shock absorber constituting the preferred embodiment of my invention. Figs. 2 to 6 are perspectives of appurtenances used in the embodiment shown in Fig. 1. Fig. 1ª is a view illustrating a modified shock absorber in side elevation as properly applied to a vehicle. Fig. 2ª is an enlarged view, partly in side elevation and partly in vertical section, of the modified shock absorber *per se*. Fig. 3ª is a view of the absorber, taken at right angles to Fig. 2ª. Fig. 4ª is a detail horizontal section, taken in the plane indicated by the line 4—4 of Fig. 2ª, and showing the means for increasing the frictional contact between the resilient U-shaped members of the device.

Referring by numerals to the drawings, and more particularly to Figs. 1 to 6 thereof: 4 is the lower U-shaped member of my novel shock absorber. The said member is composed of a plurality of leaves, and the leaves may be increased or diminished in number as occasion demands. The bight or lower portion of the member 4 is arranged in a base casting 25, having sides apertured at 28 to receive means for attaching to an axle of a vehicle. Arranged between the sides of the base casting, below the apertures 28, is a block shown by dotted lines in Fig. 1, and the member 4 is connected to the base casting and to the said block by a bolt 26, which extends through the base casting and the several leaves of the member 4, and is threaded into the said block. Suitably connected to the inner leaf of the member 4 are channel irons 30 of thin metal stock, which are designed to receive and guide the depending portions 7 of the upper member, with a view to holding both the upper member and the lower member against lateral deflection, and also with a view to obviating unnecessary wear between the resilient arms 12 of the lower member and the resilient arms 7 of the upper member. In addition to the resilient arms 7, the upper member comprises a metallic block 6 disposed between the upper portions of the arms 7 and apertured to receive a bolt for connecting it to the said arms 7. The said block 6 is provided with depending portions having apertures to receive a pintle 32, through the medium of which the block is pivotally connected to a member 31. This member 31 has an apertured depending portion, and the latter is interposed between and pivotally connected by a bolt 35 to the spaced projections 34 of an arm 33, which latter is designed to be fixedly connected to the body of a vehicle. It will be manifest that the construction described is such as to compensate for any swinging movements that take place. It will also be manifest that the frictional contact between the arms 12 of the lower member 4, and the arms or depending portions 7 of the upper member may be depended on to provide sufficient frictional contact to adequately cushion the body of the vehicle, to prevent the transmission of shock and jar to said body, and to preclude undue or violent upward movement of the body with respect to the axle of the vehicle. I would further have it understood at this point that by varying the number of leaves in the lower member 4, and the number of leaves in the upper member, the absorber can be fitted to the capacity of the vehicle or the load that the same is intended to carry on its body.

In the embodiment of my invention shown in Fig. 1ª the shock absorber is arranged in or adjacent to an elliptical spring 1 that is interposed between and connected with the vehicle axle 2 and the vehicle body 3. It is to be understood, however, that my novel absorber may be interposed between and connected with a vehicle axle and a vehicle body at any other point and in any approved manner without involving departure from the scope of my invention as claimed.

As best shown in Fig. 2ª the modified shock absorber comprises a U-shaped member 4ª that is provided with resilient arms 5, a U-shaped member 6ª arranged in reversed relation to the member 4ª and having resilient arms 7ª, and means for yieldingly pressing the arms of the said members against each other with a view to increasing the frictional contact between the members. The arms of the member 4ª are converged toward the mouth of said member, and the arms of the member 6ª are converged toward the body thereof. From this it follows that incidental to the upward movement of the upper member the arms of the lower member will be yieldingly pressed outward. The resiliency of the arms 5, however, may be depended on to cause said arms to closely hug the arms of the upper member. Manifestly on upward or downward movements of the upper member, the shock absorber will operate after the manner of a brake to retard the movements and rob the same of violence. With a view to preventing shock or jar when the shock absorber is contracted to the greatest possible extent, the base of the lower member is made in the form of a concave curve, and the ends of the arms of the upper member are curved as indicated by 9. Consequently when from any cause the members are moved toward each other to a sufficient extent, the ends 9 will be yieldingly crowded in the concavity of the lower member, and consequently one member will be checked by the other in a gradual manner. This is also true of the embodiment in Fig. 1. With a view to connecting the lower and upper members together and also with a view to increasing frictional contact between the opposed arms of the members, I provide the bolts 10 and the springs 11, and I also provide longitudinal slots 12ª in the arms of the lower member. The bolts 10 are secured by nuts or other suitable means to the arms of the upper member and are extended loosely through said slots and are equipped with nuts or other suitable enlargements 13. The springs 11 are mounted on the bolts 10 between the nuts 13 and the washers 14, the latter being loosely mounted on the bolts and being provided with projections 15, slidable in the slots 12ª, this with a view to holding the washers in proper operative position. The bolts 10 enable the lower and upper members to swing laterally with respect to each other, the bolts in said case serving as fulcrums. I would state here that the connections between the members of the modified shock absorber, on the one hand, and the vehicle body and the axle, on the other hand, are by preference pivotal connections, so as to avoid the imposition of strain on the absorber in the event of the axle or body tending to move forwardly or backwardly relative to each other.

It will be gathered from the foregoing that when a vehicle is properly equipped with my novel shock absorbers, the shock and jar ordinarily experienced when the wheels sink into depressions or pass over obstructions will be effectually absorbed, and the transmission of jolting to the body will be precluded.

Having described my invention, what I claim and desire to secure by Letters-Patent, is:

1. A shock absorber comprising tapered resilient shock absorbing members arranged and movable one within the other, said members being tapered in the same direction, and each side of each member being made up of a plurality of leaves arranged against each other.

2. In a shock absorber, the combination of tapered resilient shock absorbing members arranged and movable one within the other, said members being tapered in the same direction, and means carried by one member and engaging the other member and constructed and arranged to prevent lateral deflection of either member relative to the other without interfering with endwise movement of either member with respect to the other.

3. In a shock absorber, the combination of tapered U-shaped resilient members, each comprising a plurality of leaves constructed for connection to the parts of a vehicle and movable relatively to each other, and channel irons connected to the arms of one member and straddling the arms of the other member.

4. In a shock absorber, the combination of a lower U-shaped member comprising a plurality of leaves, a base casting receiving the bight of said member and constructed for connection to a vehicle axle, a block arranged in said base casting, a bolt extending through the leaves and threaded into the block, channel irons connected to the inner leaf of the lower member, an upper member comprising arms formed of leaves and disposed in the channel iron of the lower member, a block interposed between and connected to said leaves and having an apertured portion; the lower member being tapered upwardly and the upper member being also tapered upwardly, and the arms of each being resilient, a member pivotally connected to said block, and an arm constructed for connection to a vehicle and having spaced lateral projections disposed at opposite sides of and pivotally connected to the last-named member.

5. A shock absorber comprising tapered

U-shaped resilient shock absorbing members arranged and movable one within the other and held together, one of the said members having a concave interior and the other member having the ends of its arms curved in conformity to and adapted to operate against said concavity.

In testimony whereof I have hereunto set my hand in presence of two subscribing witnesses.

ETTORE AMEDEO SPAGNOLO.

Witnesses:
 CHAS. O. BUCKE,
 EDGAR L. SPAULDING.